United States Patent
Parameswaran et al.

(10) Patent No.: US 8,018,928 B2
(45) Date of Patent: Sep. 13, 2011

(54) MODULAR APPROACH TO THE TCP/IPV6 HARDWARE IMPLEMENTATION

(75) Inventors: Sridevan Parameswaran, Kensington (AU); Jorgen Peddersen, Kensington (AU); Ashley Partis, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 10/571,929

(22) PCT Filed: Nov. 19, 2004

(86) PCT No.: PCT/AU2004/001617
§ 371 (c)(1),
(2), (4) Date: Nov. 10, 2006

(87) PCT Pub. No.: WO2005/050925
PCT Pub. Date: Jun. 2, 2005

(65) Prior Publication Data
US 2007/0086447 A1    Apr. 19, 2007

(30) Foreign Application Priority Data
Nov. 21, 2003    (AU) .............................. 2003906455

(51) Int. Cl.
*H04L 12/28* (2006.01)
*H04L 12/56* (2006.01)
(52) U.S. Cl. .................... 370/389; 370/390; 370/394
(58) Field of Classification Search .............. None
See application file for complete search history.

(56) References Cited

U.S. PATENT DOCUMENTS

| | | | |
|---|---|---|---|
| 5,802,305 A | 9/1998 | McKaughan | |
| 6,034,963 A | 3/2000 | Minami | |
| 6,101,608 A | 8/2000 | Schmidt | |
| 6,160,809 A * | 12/2000 | Adiletta et al. | 370/392 |
| 6,968,219 B2 | 11/2005 | Pattabiraman | |
| 7,003,118 B1 * | 2/2006 | Yang et al. | 380/287 |
| 7,293,113 B1 | 11/2007 | Krishna | |
| 2002/0027928 A1 * | 3/2002 | Fang | 370/468 |
| 2002/0162038 A1 | 10/2002 | Bullman | |
| 2003/0135678 A1 * | 7/2003 | Andre | 710/243 |
| 2004/0071142 A1 * | 4/2004 | Moriwaki et al. | 370/392 |
| 2004/0100964 A1 * | 5/2004 | Robotham et al. | 370/394 |
| 2004/0141524 A1 * | 7/2004 | Lee et al. | 370/469 |
| 2004/0158754 A1 | 8/2004 | Walls | |
| 2005/0220093 A1 * | 10/2005 | Chen et al. | 370/389 |
| 2006/0064510 A1 * | 3/2006 | Low et al. | 710/5 |
| 2007/0214358 A1 | 9/2007 | Partis | |

OTHER PUBLICATIONS

U.S. Appl. No. 11/573,260, filed Feb. 5, 2007.
Australian Office Action dated Jun. 8, 2006 issued during prosecution of related Australian application No. 2004202916.

* cited by examiner

*Primary Examiner* — Salman Ahmed
*Assistant Examiner* — Sori Aga
(74) *Attorney, Agent, or Firm* — Fitzpatrick, Cella, Harper & Scinto

(57) ABSTRACT

A method for processing a packet comprising an ordered sequence of packet parts is disclosed. The method uses a set of hardware processing modules, and the method comprises the steps of broadcasting, in a step the next header field of a received packet part to the set of processing modules, and processing, in a step the received packet part by a sub-set of the modules dependent upon the broadcast next header field.

11 Claims, 10 Drawing Sheets

MODULAR APPROACH TO THE TCP/IPV6 HARDWARE IMPLEMENTATION

FIELD OF THE INVENTION

The present invention relates generally to hardware architectures for TCP/IP, and in particular, to an architecture supporting implementation of modular TCP/IPv6 devices.

BACKGROUND

FIG. 1 shows a communication packet 100 based on Version 4 of the Internet Protocol (hereinafter referred to as IPv4). The packet 100 has packet parts 101-108. When considering how such packets are processed in hardware, the OPTIONS packet parts 106-107 are of particular importance as will be explained in regard to FIGS. 2 and 3.

FIG. 2 shows an example of how the packet 100 of FIG. 1 can be processed in an IPv4 environment. The process 200 comprises process steps 201-206. A dashed arrow 207 on the right-hand side of the process step 201 indicates that the process step 201 makes use of information in the packet parts 101-105 of the packet 100 of FIG. 1. Similar dashed arrows are associated with the process steps 202 and 204-206 and in each case relate to the packet parts that are required by the corresponding process step.

The first step 201 reads the header of the packet 100. The header comprises the packet parts 101-105. The step 201 checks the DESTINATION ADDRESS at 105, and calculates the header checksum. In order to determine the header checksum all the packet parts 101-105 and 106-107 are required. Accordingly, the checksum is determined over the entire header, including the options. Thereafter, a step 202 processes OPTIONS fields in the packet parts 106-107. In the present packet example 100, the OPTION relates to the IPv4 ROUTING option. The subsequent step 203 discards the packet 100 if the header checksum calculated in the step 201 is incorrect. A following step 204 performs operations concerned with fragment handling. This relates to the situation in which the packet 100 is one of a number of packets associated with a source data packet (not shown) that has been fragmented. The step 204 thus involves consideration of the PACKET IDENTIFICATION field and the FRAGMENT OFFSET field at 102 to check that fragmentation integrity has been maintained. Thereafter, a step 205 adds data from the DATA packet part 108 to a fragment buffer (not shown), provided that the check carried out in the step 204 is valid. A following step 206 establishes whether the data fragment carried in the packet 100 is the final fragment from the source data packet. If this is the case, then the data payload in the packet part 108, plus other information from the packet header is sent to the transport layer for sending to the next destination.

The process 200 can be realized using one or more processing modules implemented as state machines. It is apparent that the process 200 accesses and operates upon the packet parts 101-108 of the packet 100 in a non-linear fashion. Thus, for example, even though the packet parts 101-105 are processed in the step 201, the packet part 102 is again processed by the step 204. Because of the non-linear packet part access that is required for IPv4 processing, practical implementations of processors for IPv4 packets typically include a control module as well as other modules. The control module is generally responsible, among other things, for scheduling the flow of packet data among the other processing modules.

A multiplicity of communication paths are required for the aforementioned non-linear packet part access and processing between the control module and the other processing modules. Processing and communication also takes place between the other processing modules themselves. The arrangement of the communication paths and the data and control flows are dependent upon the type of packets being processed, and in particular, dependent upon the OPTIONS included in the packets. Thus, it is difficult to customise the structure of an IPv4 processing machine to specific circumstances.

FIG. 3 shows a representative prior art process flow for processing an IPv4 packet, using hardware processing modules in the IPv4 environment. FIG. 3 depicts an architecture having a control module 308, an IPv4 module 309, a routing module 310 and a fragmentation module 312.

In a first step 301 the control module 308 receives the packet (such as 100 in FIG. 1) from a data bus that is depicted a "B" in a circle. In a following step 302 the control module 308 sends IP header data onto the data bus "B". The IPv4 module 309 reads the header data from the bus "B" and processes the header data in a step 313. The aforementioned steps 301-302 and 313 correspond to the step 201 in FIG. 2. In a next step 303 the control module 308 checks the OPTION field in the packet 100, and then a step 304 sends routing option data to the routing module 310 over the bus "B". The routing module 310 processes the received routing data in a step 314. The steps 303-304 and 314 correspond to the step 202 in FIG. 2. The next step 305 again checks the OPTION field in the packet 100 after which a step 306 send fragmentation option data to the fragmentation module 312. The fragmentation module 312 processes the fragmentation data in a step 315. The steps 305-306 and 315 correspond to the steps 204-206 in FIG. 2. A re-entrant arrow 311 indicates that the processing of fragmentation data (ie adding data to the fragment buffer referred to in relation to FIG. 2) is associated with a corresponding process step for the next packet if not all fragments have yet been received. A final step 307 sends data to the transport module (not shown).

It is apparent from FIG. 3 that the packet process 300 involves repeated communication between the control module 308 and the other modules 309, 310 and 312. Furthermore, the accesses to the packet parts 101-108 of the packet 100 are non-linear.

SUMMARY OF THE INVENTION

This specification describes a hardware architecture that facilitates customisation of IP processing machines to specific circumstances. The architecture can be decomposed into "essential" and "selectable" processing modules. Typically the "essential" modules in any system, (having regard to the receive side 504 of the system 500 in FIG. 5 for example), are the IPv6 receive module 501, and at least one transport module such as the TCP receive module 517. Having regard to the transmit side 505 of the system 500, the "essential" modules are the IPv6 send module 526, and at least one transport layer module such as the TPC send module 522, as well as the IPv6 scheduler with neighbour discovery 519 (see FIG. 5). Essential modules are required in every IPv6 processing machine, while selectable modules may be included or omitted depending upon the particular application. The selectable modules are often, but not always, associated with the presence or absence of various OPTIONS fields in the packets being considered (IPv6 packets will be described in more detail in regard to FIG. 4).

Selectable processing modules may be included or omitted from the disclosed arrangements without requiring extensive reworking of inter-module communication and data flows. In some cases selectable modules can be added or omitted with only minor changes to "glue" logic in order to accommodate the change to the architecture. In many cases, even these minor logic changes are not required. This architecture is referred to as the "modular architecture" in this description.

According to one arrangement, the modular functionality is provided by broadcasting NEXT HEADER fields to a set of processing modules, one of which seizes control according to the specifics of the broadcast NEXT HEADER field. According to another arrangement, an a-priori sequence of processing modules is established according to the order of the packet parts of an incoming packet.

In the modular architecture, the flow of packet data (see 410 in FIG. 4) and the direction of inter-module hand-over of processing control generally takes place in one direction along a logical processing path. However, in some cases, control information may also flow in the opposite direction along the logical processing path. OPTION packet parts (such as 405-407 and 408-409 in FIG. 4) in each packet (such as 400 in FIG. 4) can be ordered differently within the packet 400. Furthermore, not all packets 400 in a packet stream need have the same options. However, the modular architecture provides, in regard to each packet, a packet-specific logical processing path in which the uni-directional processing and hand-over of processing control described above is performed.

The NEXT HEADER fields (at 405 and 408 in FIG. 4) that are present for each IPv6 OPTION, facilitate provision of the packet-specific linear logical processing path. Once a "current" processing hardware module has performed an associated processing operation on an associated packet part of the current IPv6 packet, that current hardware module is no longer needed to process the packet in question. The current module then "hands over" the processing and control role, and any data that is required, to the relevant "next" processing module. Similarly, once the next processing hardware module has performed an associated processing operation on the associated next packet part, the next module then hands over the processing and control role, and any data that is required, to the relevant subsequent processing module and so on. A common communication medium and uniform module interfaces are used to implement the modular architecture.

The modular architecture enables IPv6 packets with any one of a variety of upper layer protocols (such as TCP, ICMP, UDP and so on) and one or more IPv6 OPTIONS to be processed. If a particular application needs a specific IPv6 stack, the architecture can be realised in a modular fashion, incorporating only those processing modules which are needed for the particular processing stack. Modules which are not required for the application in question can be easily and transparently omitted from the implemented system, without impairing the function of the overall system and without requiring extensive reworking of the communication and control paths in the system. This approach allows, for example, an optimised Application Specific Integrated Circuit (ASIC) to be implemented for a specific application without incorporating unnecessary processing modules.

According to a first aspect of the present disclosure, there is provided a method for processing a packet comprising an ordered sequence of packet parts using a set of hardware processing modules, the method comprising the steps of:

broadcasting the next header field of a received packet part to the set of processing modules; and processing the received packet part by a sub-set of the modules dependent upon the broadcast next header field.

According to another aspect of the present disclosure, there is provided a method for processing an IPv6 packet for sending, the packet comprising an ordered sequence of packet parts, using a set of processing modules, the method comprising the steps of:

(a) handing control to a current one of the set of modules, wherein said current module:
  (i) processes a corresponding packet part;
  (ii) appends, to the packet part, a next header field referencing said current module;
  (iii) concatenates, if a received packet part has been obtained, the packet part with the received packet part to form a composite packet part; and
  (iv) sends the composite packet part to a subsequent one of the set of processing modules;

(b) handing control to the subsequent one of the set of processing modules which is thereby designated ; and (c) repeating the steps (a)-(b) until the packet is completely processed.

According to another aspect of the present disclosure, there is provided a modular apparatus for processing a packet comprising an ordered sequence of packet parts, the apparatus comprising:

a set of hardware processing modules;

means for broadcasting the next header field of a received packet part to the set of processing modules; and means for processing the received packet part by a sub-set of the modules dependent upon the broadcast next header field.

According to another aspect of the present disclosure, there is provided a modular apparatus for processing, using a notionally indexed sequence of processing modules, a packet comprising a correspondingly notionally indexed sequence of packet parts, said apparatus comprising:

the indexed sequence of processing modules; and means for repeatedly assigning a sub-set of said modules for processing a corresponding sub-set of said packet parts until all the packet parts have been processed; wherein:

a lowest index of each successive said sub-set of modules is greater than a lowest index of a previous said sub-set of modules; and a lowest index of each successive said sub-set of packet parts is greater than a lowest index of a previous said sub-set of packet parts.

Other aspects of the invention are also disclosed.

BRIEF DESCRIPTION OF THE DRAWINGS

Some aspects of the prior art and one or more embodiments of the present invention will now be described with reference to the drawings and appendices, in which.

DETAILED DESCRIPTION INCLUDING BEST MODE

Figure 1:
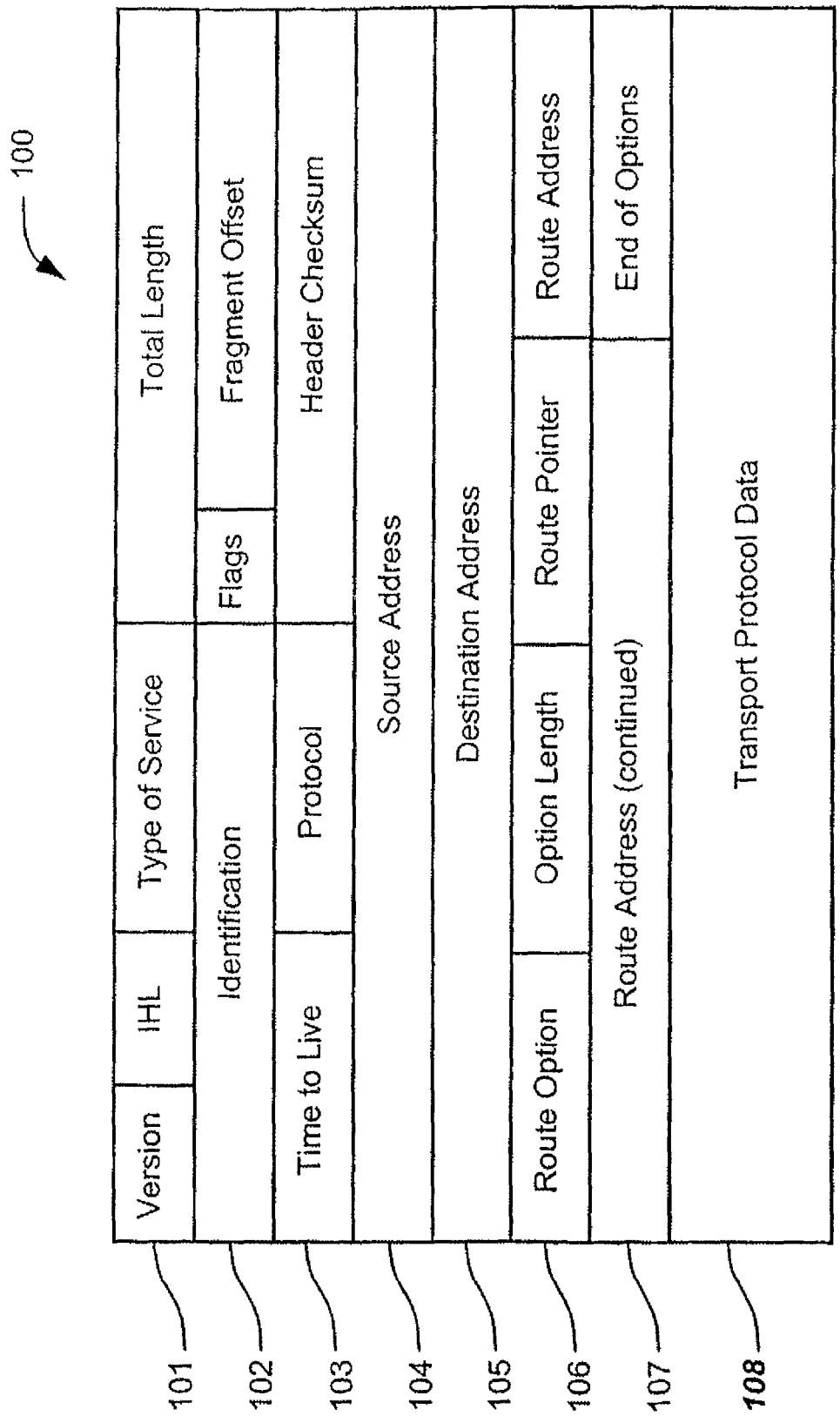
FIG. 1 shows an IPv4 communication packet.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

IP version 6 (IPv6) is the successor to IP version 4 (IPv4). The changes from IPv4 to IPv6 include header format simplification, and improved support for extensions and options.

Figure 4:
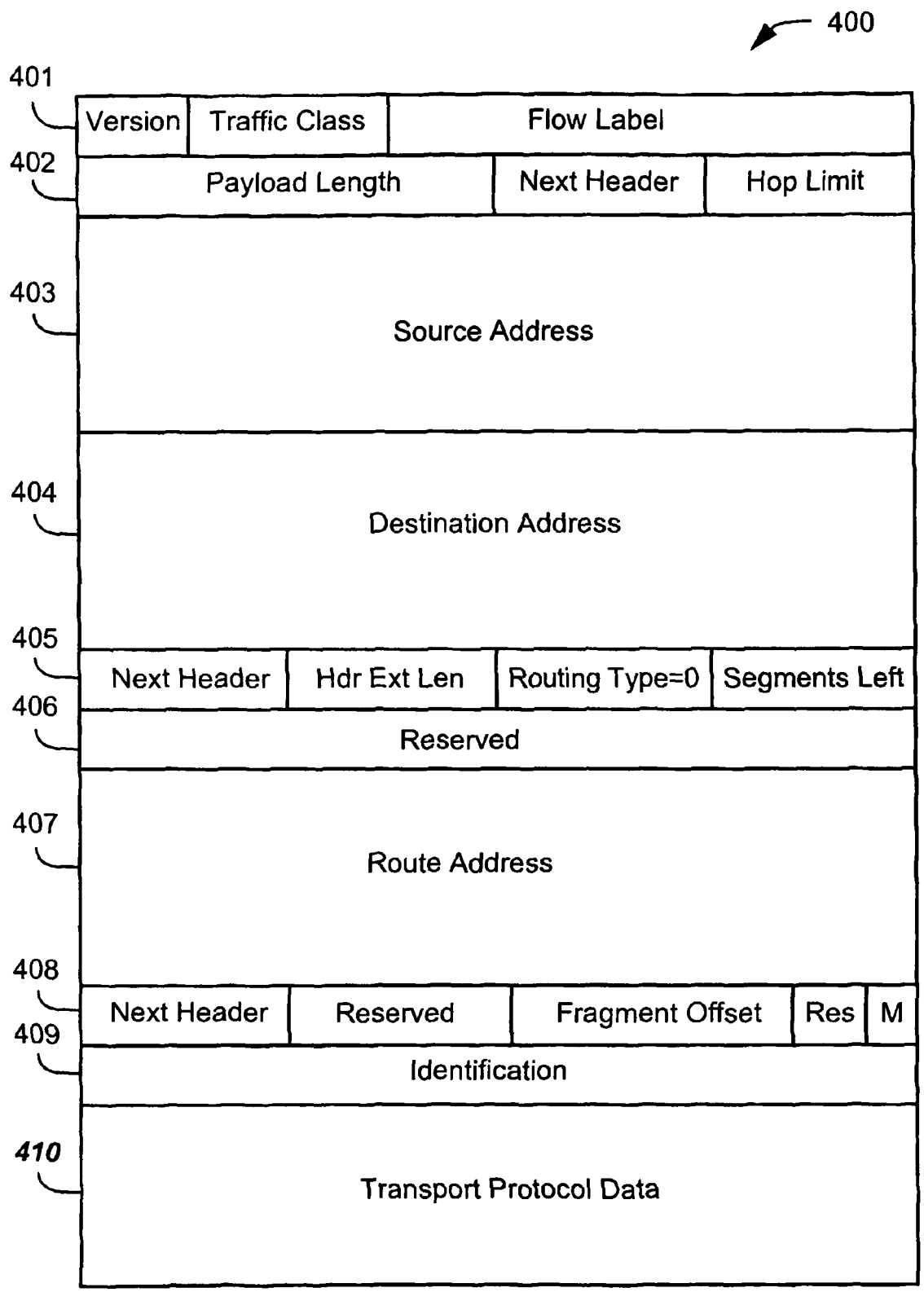
FIG. 4 shows an IPv6 communication packet.

FIG. 4 shows an IPv6 communication packet 400. The packet 400 has packet parts 401-410. Of particular importance, when considering how such IPv6 packets are processed in hardware, are the OPTIONS packet parts 405-407 and 408-409. The packet parts 405-407 relate to a ROUTING option, and the packet parts 408-409 relate to a FRAGMENTATION option. It is noted that only the NEXT HEADER fields at the packet parts 402, 405 and 408 are placed onto the address bus (see "AB" in FIGS. 9 and 10).

Figure 5:
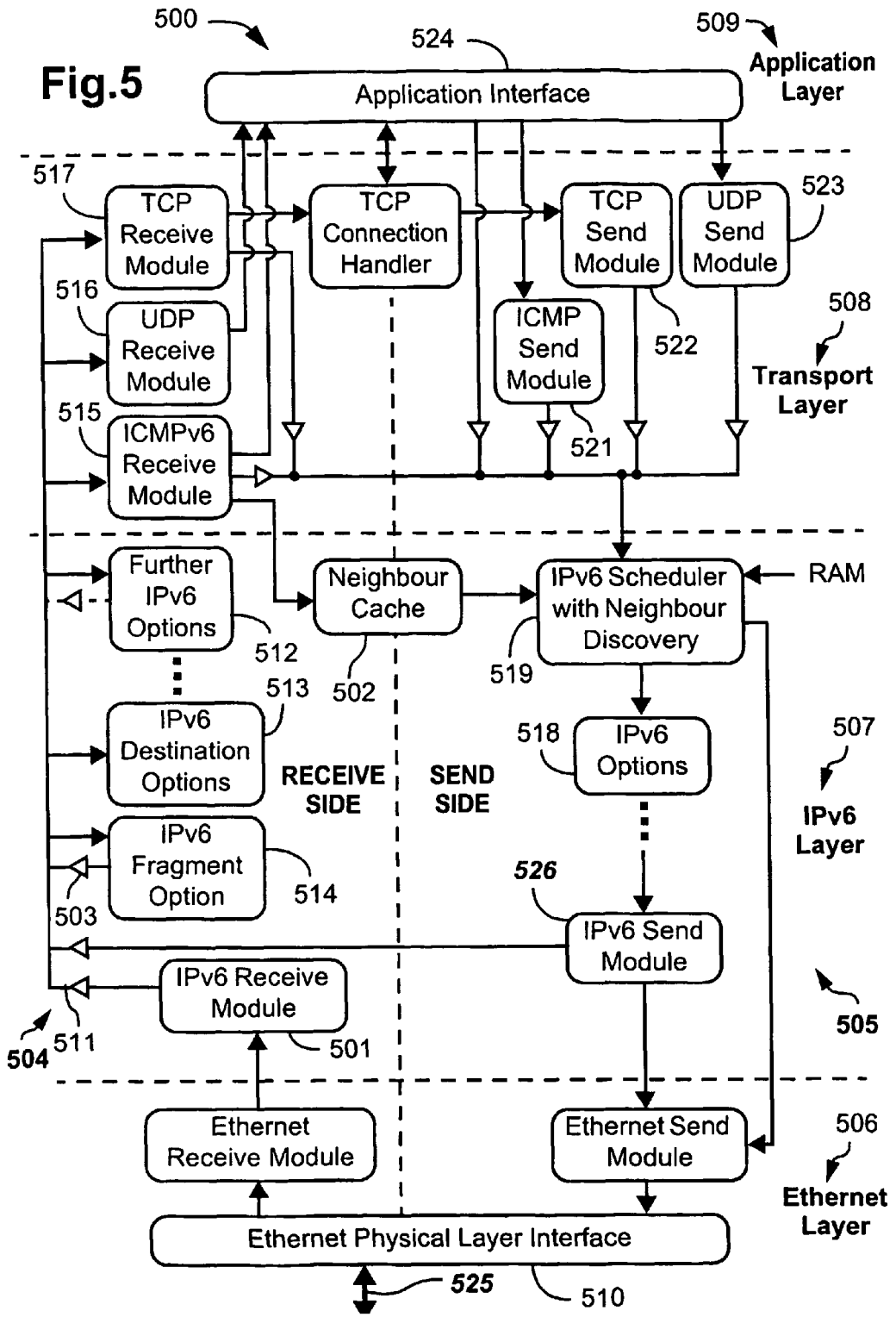
FIG. 5 shows an example of a hardware IPv6 processing system using the disclosed modular architecture.

FIG. 5 shows one example of a hardware IPv6 processing system 500 implemented using the disclosed modular architecture. Rounded boxes such as 501 (which refers to an IPv6 Receive Module) indicate modules or groups of state machines that implement a protocol or an OPTION. Rectangular boxes such as 502 (which depicts a 'Neighbour Cache') indicate memory elements. Triangles such as 503 indicate tri-state driving units.

The system 500 is split into two sides 504 and 505 for respectively receiving and sending data over a bus 525. Layers 506-509 correspond respectively to the Ethernet layer, the IPv6 (also referred to as the Network or Inter-network) layer, the transport layer and the application layer. Each of these layers 506-509 has its own communication mechanism with other layers.

In order to increase the speed and throughput of the system 500 on the receive side 504, all protocols are designed to avoid buffering of packets between layers. Data is operated on in parallel as much as possible, and is operated on while a packet is still arriving. Accordingly, after each packet arrives at the Ethernet interface 510, the packet is passed to the IPv6 Receive Unit 501 that places the packet onto a receive bus 511. As will be described in relation to FIGS. 9 and 10 the bus 511 includes a data bus (referred to as "DB" in FIGS. 9 and 10) and an address bus (referred to as "AB" in FIGS. 9 and 10). This bus 511 carries broadcast packet data, making it available to other modules connected to the bus 511. Thus, for example, the transport layer 508 can operate on the broadcast packet data by, for example, storing the packet data in RAM (not shown), as soon as the data is presented on the bus 511. No memory units are used in the network layer 507 except possibly for small registers (not shown) in the various modules. This minimises the packet processing delay in the network layer 507. A similar arrangement is used when sending a packet using the send side 505.

The bus 511 constitutes the common communication medium for the receive side, and the processing modules (such as 515) typically have uniform interfaces to communicate over the bus 511. Modules which have interfaces that are uniform (ie perfectly compatible with the bus 511) can be added or removed without requiring glue logic patches. When module interfaces are only substantially uniform (ie somewhat less compatible), then some glue logic patches will be required when modules are added or removed.

The receive side 504 of the system 500 uses mainly the one bus 511 for inter-module communications. OPTIONS in IPv6 are identified by an associated NEXT HEADER field such as 405 for each option. This contrasts with the monolithic PROTOCOL field at 103 in the IPv4 packet 100. Each OPTION in the IPv6 packet 400 has an associated NEXT HEADER value. In this way, the IPv6 protocol enables substantially any number of OPTIONS to be present in an IPv6 packet. The final OPTION in the packet has a NEXT HEADER value referencing the destination protocol for the packet. This destination protocol may, for example, be ICMP (which is processed by a corresponding module 515), UDP (which is processed by a corresponding module 516), TCP (which is processed by a corresponding module 517) and so on.

The disclosed implementation of the system 500 can handle any order of IPv6 OPTIONS in a packet. On the receive side 504, this flexibility is achieved by implementing the single bus 511 with all OPTION modules 512-514, and all protocol modules 515-517, listening to the bus 511. This provides the broadcast communication capability needed to support the semi-transparent addition and removal of processing modules at the network layer 507 and the transport layer 508. Any OPTION module (eg 512) or protocol module (eg 517) can process the information associated with their own NEXT HEADER. When appropriate, an aforementioned module can let the next OPTION module (ie the OPTION module referenced by the subsequent NEXT HEADER field of the packet) know when its NEXT HEADER is about to start being streamed on the bus 511.

Still considering the receive side 504 the packets are processed in real time at line speed or greater as the packets are passed from the network layer 507 through the required OPTION modules 514-512 and on to the transport layer 508. All the IPv6 option processing modules 514-512 and the transport layer protocol modules 515-517 communicate via the receive bus 511. A current module processes the data in the packet part with which the current module is associated. When the current module has completed its processing, it signals, by sending the subsequent NEXT HEADER over the address bus AB which forms part of the bus 511, all other modules that the next module is to commence processing. The packet data is, in the mean time, being passed blindly on the bus 511 and is thus available to all modules.

According to this modular arrangement, the 'Bus Master', which for the receive side 504 is the Receive Module 501, does not need to know which processing modules are present in the system 500.

Figure 3:
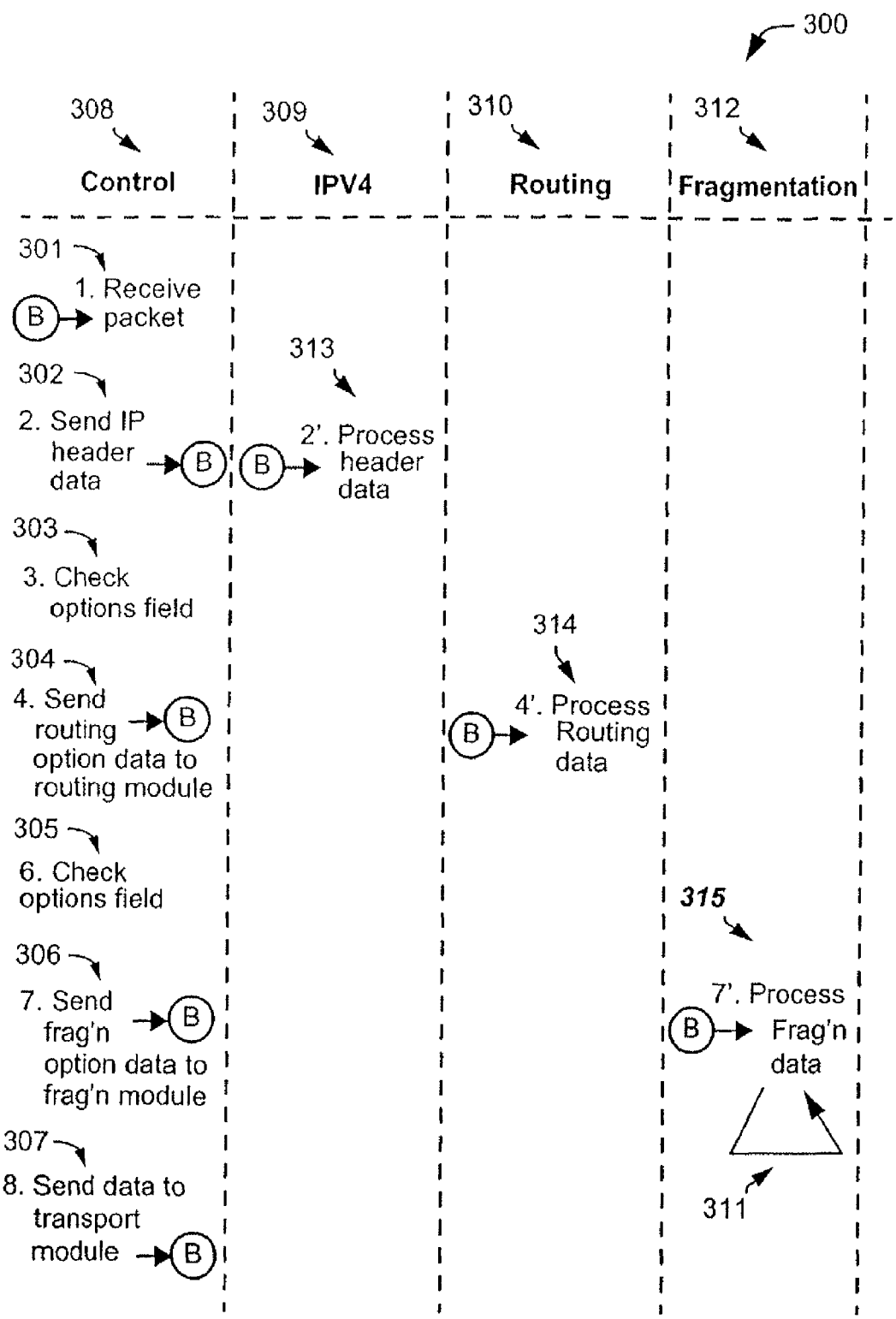
FIG. 3 shows distribution of the process flow of FIG. 2 among processing modules.

The modular arrangement also enables a packet to be dropped cleanly if the required processing module is not present. In this event, an error message can be generated if desired. More particularly, even if the NEXT HEADER that is placed onto the address bus is not recognised by any processing module that has been realised in the particular system being considered, this does not cause a communication failure since the OPTION associated with the aforementioned NEXT HEADER is merely not acted upon. Furthermore, it is possible to incorporate a function, either in a separate module or as an additional capability in an existing module, which recognises that no other module has reacted to the NEXT HEADER in question and emits an error message. In contrast, in IPv4 if a particular processing module is not implemented then the central controller (such as 308 in FIG. 3) needs to be made aware that the module in question is absent.

When the ASIC is implemented, this modular arrangement enables modules to be added to, or removed from, the network and transport layers 507, 508 with little or no impact on other modules which are to be included. The addition and/or removal of modules can be implemented at various stages in the ASIC design/fabrication process. Thus, for example, modules can be added and/or removed at the system block level stage, the Register Transfer Level (RTL) description level stage, and/or the net-list level stage. These aforementioned design/fabrication stages will be referred to generally as the ASIC 'synthesis stage'.

The system 500 that is implemented using the modular approach enables a typical received IPv6 packet to be processed without buffering until the packet reaches the transport layer 508, thus reducing costly memory access operations. Packet reconstruction options however, such as IPv6 fragmentation, and IPSec, do require limited amounts of buffering at the network layer 507.

Turning to the send side 505 of the system 500, it is noted that in order to send an IPv6 packet, OPTIONS may also be required. A chain of OPTION modules 518 is incorporated into the system 500 so that OPTION modules in the chain 518 can add appropriate NEXT HEADER fields (which may be in the order recommended by RFC 2460) to an outgoing packet. Each required NEXT HEADER is thus created by an associated processing module. The order in which NEXT HEADER fields are created is controlled by extra logic in the chain 518, thereby allowing the sending bus masters (ie the packet Scheduler 519 and the transmit IPSec unit which forms part of the chain 518) to determine which OPTIONS are to be incorporated into which packet parts. This arrangement allows for fast creation of packet headers (often faster than line speed) while requiring no extra memory to buffer the created IPv6 OPTION headers before they are incorporated into the packets for sending. This arrangement also allows the modules that create and handle IPv6 OPTIONS on outgoing packets on the transmit side 505 to be added or removed when the ASIC design is synthesised (ie at one or more of the system block, RTL or net-list description stages).

Since the transmit side 505 predetermines which OPTION fields are to be added to outgoing packets, modularity can be achieved without needing the handover of control and broadcast of information to all modules as is needed on the receive side. Provision of a common communication medium and uniform module interfaces are sufficient to provide the modular architecture on the transmit side 505. According to this arrangement, since each OPTION is known ahead of time, the OPTIONS can be set up via logic ahead of time.

Figure 7:
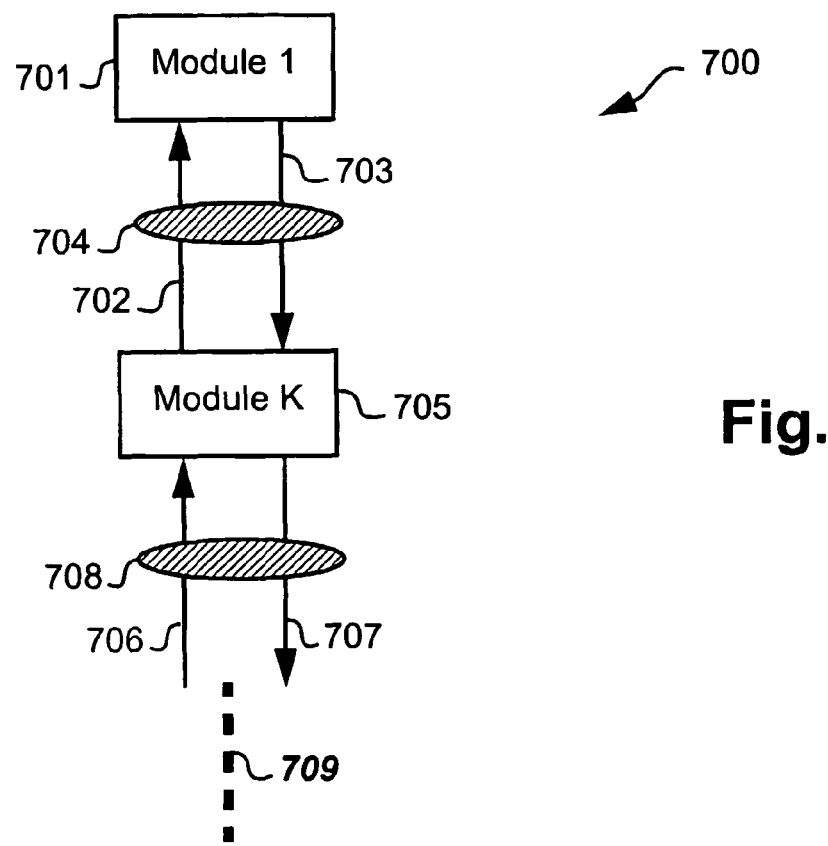
FIG. 7 shows IPv6 hardware modules communicating over a common communication chain medium.

According to one example, the chain 518 of OPTION modules on the transmit side 505 is implemented by cascading the option modules as described in regard to FIG. 7. According to this chain arrangement, the output of one OPTION module feeds into the input of a following OPTION module, whose output in turn feeds into the input of a succeeding module. Each OPTION module thus outputs its own NEXT HEADER field to the lower downstream OPTION modules, (ie those modules towards the Ethernet layer 506), and then allows the higher upstream OPTION modules (ie those modules upstream towards the application layer 509) to output their header and data. At the bottom of this chain is the data link layer 510, which operates on the same basis as the OPTION module chain 518.

As noted, the receive side 504 of the system 500 uses the common bus 511 for communication between the receive OPTION modules 512-514, while the transmit side 505 of the system 500 uses a chain arrangement depicted by 518. Both these arrangements are examples of inter-module communication using (a) a Common Communication Medium, and (b) a Uniform Module Interface as will be described in regard to FIGS. 6 and 7.

Figure 6:
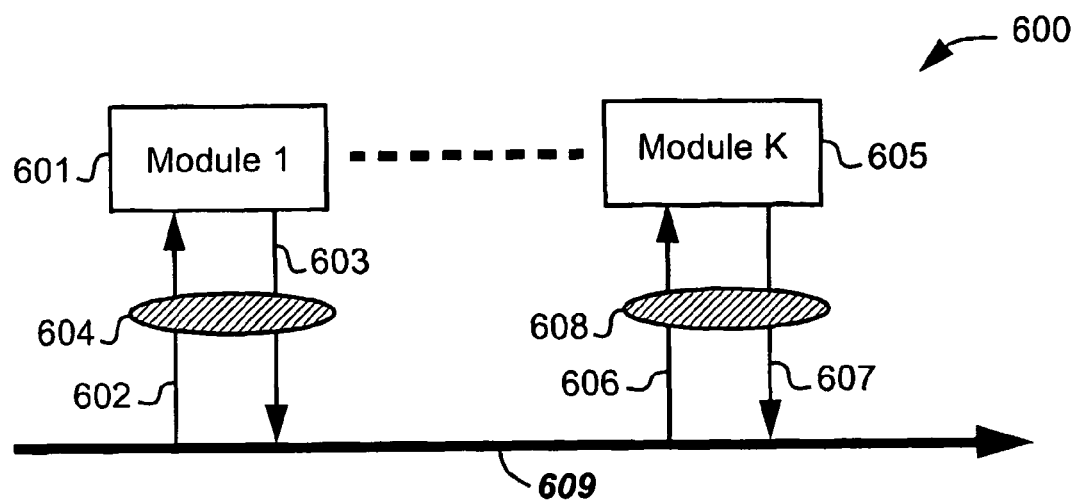
FIG. 6 shows IPv6 hardware modules communicating over a common communication bus medium.

FIG. 6 shows an arrangement 600 having modules 601, . . . , 605 that communicate over a common communication medium 609 which is depicted as a bus in FIG. 6. This arrangement is similar to the communication bus arrangement 511 used in FIG. 5. The bus 609 is depicted as being bi-directional, but unidirectional media may also be used. The module 601 receives, as depicted by an arrow 602, data off the bus 609, via a uniform module interface 604. The module 601 sends, as depicted by an arrow 603, data onto the bus 609, via the uniform module interface 604. The module 605 receives, as depicted by an arrow 606, data off the bus 609, via a uniform module interface 608. The module 605 sends, as depicted by an arrow 607, data onto the bus 609, via the uniform module interface 608.

FIG. 7 shows an arrangement 700 having modules 701 and 705 that communicate over a common communication medium 709 which is depicted as a cascaded chain. This arrangement is similar to the communication chain arrangement 518 used in FIG. 5. The chain 709 is depicted as being bi-directional in FIG. 7, but uni-directional media may also be used. The module 705 receives, as depicted by an arrow 703, data from the module 701, via a uniform module interface 704. The module 705 sends, as depicted by an arrow 707, data to the next module (not shown) on the chain 709, via a uniform module interface 708. The module 701 receives, as depicted by an arrow 702, data from the module 705, via a uniform module interface 704. The module 705 receives, as depicted by an arrow 706, data from modules further down the chain (not shown) via a uniform module interface 708. The module 701 sends, as depicted by an arrow 703, data to the module 705, via the uniform module interface 704.

Returning to FIG. 5, it is noted that the transport layer protocol modules 521-523 are connected to the packet scheduler 519 by a simple bus 520. Outgoing packets are output by the IP Scheduler 519 before the packets are sent down the chain 518 on the transmit side 505. The Scheduler 519 uses Neighbour Discovery to determine the link layer address of the next hop node (not shown). The scheduler 519 receives packets to be sent from the transport layer 508 (using a pointer to the RAM memory where the packet is stored), and the scheduler 519 also receives information such as the destination of the outgoing packet and so on. The Scheduler 519 uses next hop determination and the neighbour cache 502 to determine whether the Scheduler 519 already knows what the link layer address is for the next hop device. If this address is not known, the Scheduler 519 performs the required Neighbour Solicitation operations. Multiple packets can be buffered while waiting for neighbour advertisements to arrive. There is, accordingly, very little delay to any protocols that wish to send packets.

The above arrangement allows the transport option modules 521-523 on the send side 505 to be plugged blindly into the system 500 above the packet scheduler 519 in a modular fashion at the ASIC synthesis stage. The IP scheduler 519 is not "aware" of the protocols above it. In other words, the scheduler 519 does not differentiate between different transport layer protocols such as the TCP module 522, and the UDP module 523. Consequently, the scheduler 519 is not affected by which protocols may or may not be present.

An application interface 524 controls communication between the system 500 and the software application (not shown). This interface 524 can be implemented as a programming or communication interface for the ASIC. This interface is adapted to support communication with the software application via a peripheral or system bus (not shown) such as Advanced Microprocessor Bus Architecture (AMBA).

Figure 8:
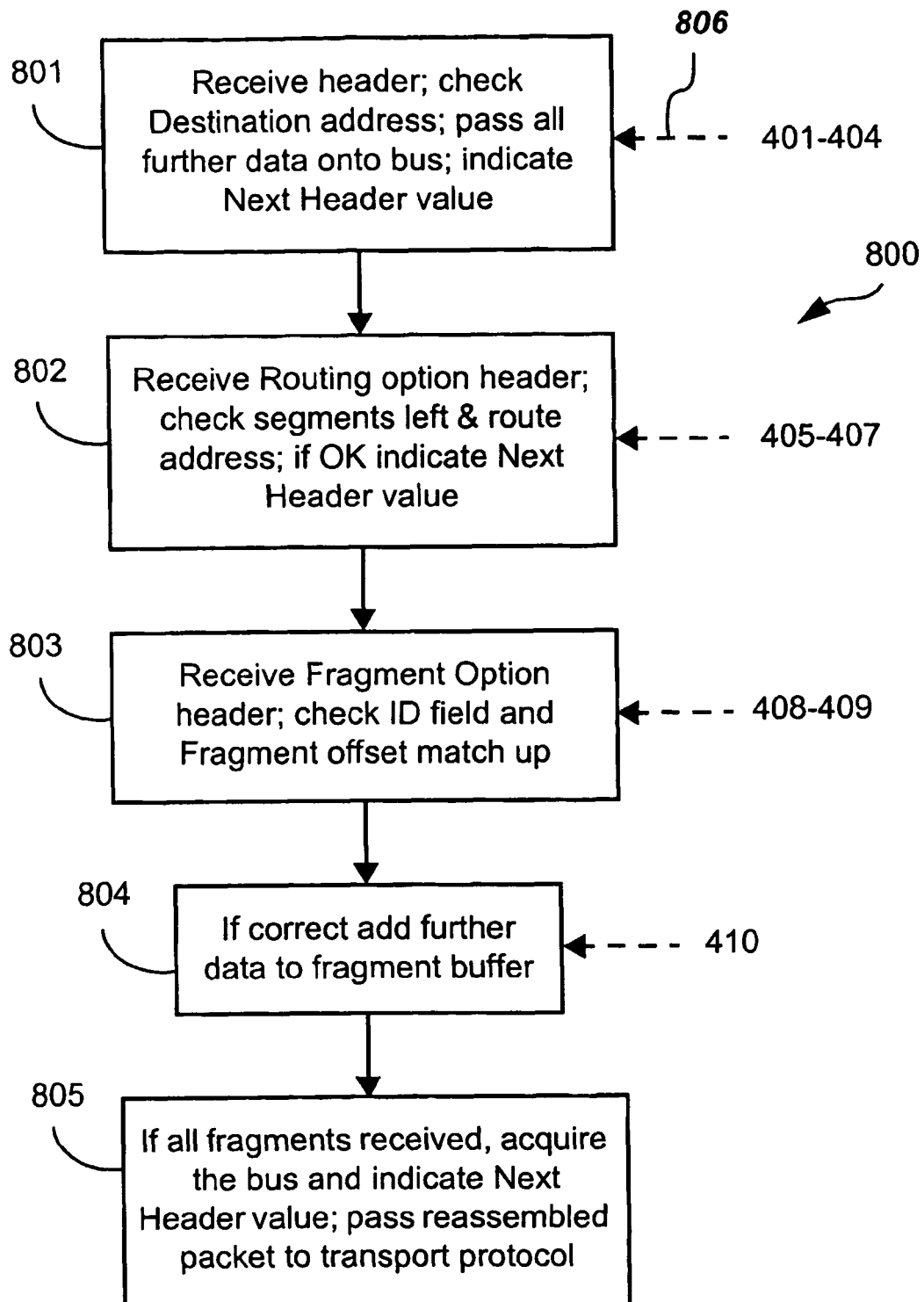
FIG. 8 shows a process flow diagram for an IPv6 packet using the disclosed modular architecture.

FIG. 8 shows an example of how the packet 400 of FIG. 4 can be processed in an IPv6 environment. The process 800 comprises process steps 801-805. A dashed arrow 806 on the right-hand side of the process step 801 indicates that the process step 801 makes use of information in the packet parts 401-404 of the packet 400 of FIG. 4. Similar dashed arrows are associated with the process steps 802-804 and in each case relate to the packet parts that are required by the corresponding process step.

A first step 801 (implemented by the IPv6 receive module 501 in FIG. 5) reads the base IPv6 header of the packet 400 of FIG. 4. The header comprises the packet parts 401-404. The step 801 checks the DESTINATION ADDRESS (at 404) and writes the subsequent NEXT HEADER value (at 402) onto the bus 511. The step 801 also passes all further packet data (from 405 onwards) onto the bus 511. These actions make the NEXT HEADER associated with the ROUTING OPTION, the ROUTING OPTION, and the FRAGMENT OPTION, as well as the packet data at 410, available to all processing modules that are listening to the bus 511. It is note that the initial NEXT HEADER resides at 402. The NEXT HEADER at 402 relates to the packet parts 405-407. The NEXT HEADER at 405 relates to the packet parts 408-409.

A following step 802 (implemented by the ROUTING OPTION module which is not explicitly shown but is part of the OPTION modules 512 in FIG. 5 receives the ROUTING OPTION header from the packet part 405. The step 802 also checks the SEGMENTS LEFT field at the packet part 405 and the ROUTE ADDRESS field at the packet part 407. If this check is satisfactory, then the step 802 indicates the subsequent NEXT HEADER value from the packet part 405 by writing the value onto the bus 511.

A following step 803 (that is implemented by the fragmentation module 514 in FIG. 5) receives the packet parts 408-409, including the FRAGMENT OPTION header from 408. The step 803 also checks the IDENTIFICATION field at the packet part 409 to verify that it is consistent with the FRAGMENT OFFSET field at 408.

A following step 410 (that is implemented by the fragmentation module 514 in FIG. 5) performs tests concerned with fragment handling, and adds data from the DATA packet part 410 to a fragment buffer (not shown) provided that the check carried out in the step 804 is valid.

Thereafter, if all fragments have been received a step 805 indicates the subsequent NEXT HEADER value at 408 onto the bus 511. The step 805 also passes the reassembled packet to the appropriate transport protocol (515-517) depending on which protocol is defined by the aforementioned NEXT HEADER field.

Figure 2:
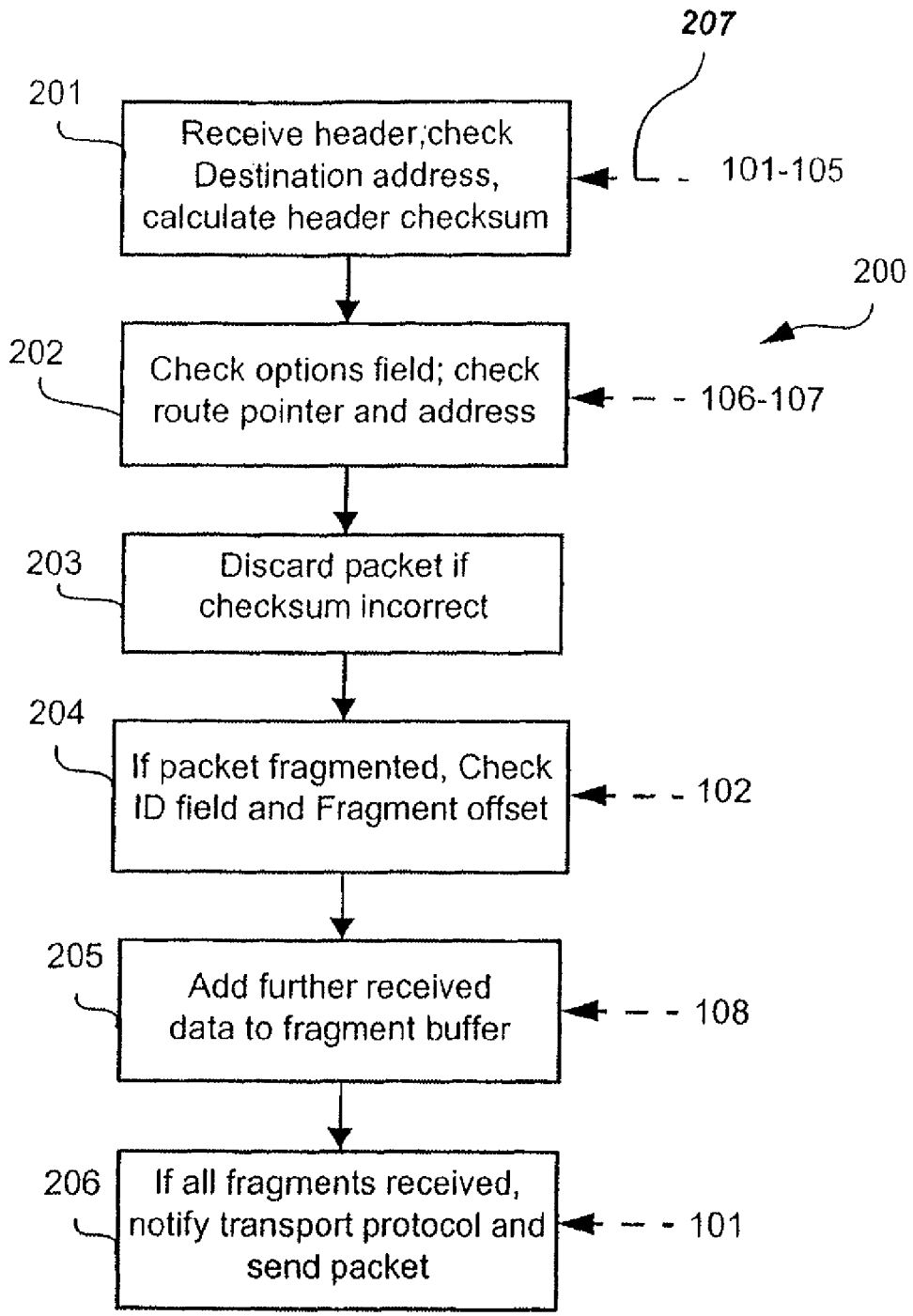
FIG. 2 shows a logical process flow diagram for the Ipv4 packet of FIG. 1.

In contrast to the process in FIG. 2, it is apparent that the process 800, which comprises the steps 801-805, accesses the packet parts 401-410 of the packet 400 in a linear fashion. Thus, for example, once the packet parts 401-404 have been processed in the step 801, the packet parts 401-404 are not required by other (later) steps in the process 800. Because of this linear packet part access, provided by the disclosed modular approach, processors for IPv6 applications using the modular architecture typically do not require a control module. Furthermore, it is relatively straightforward to tailor the structure of the IPv6 processing machine to specific circumstances by adding and/or removing modules on a customised basis.

Figure 9:
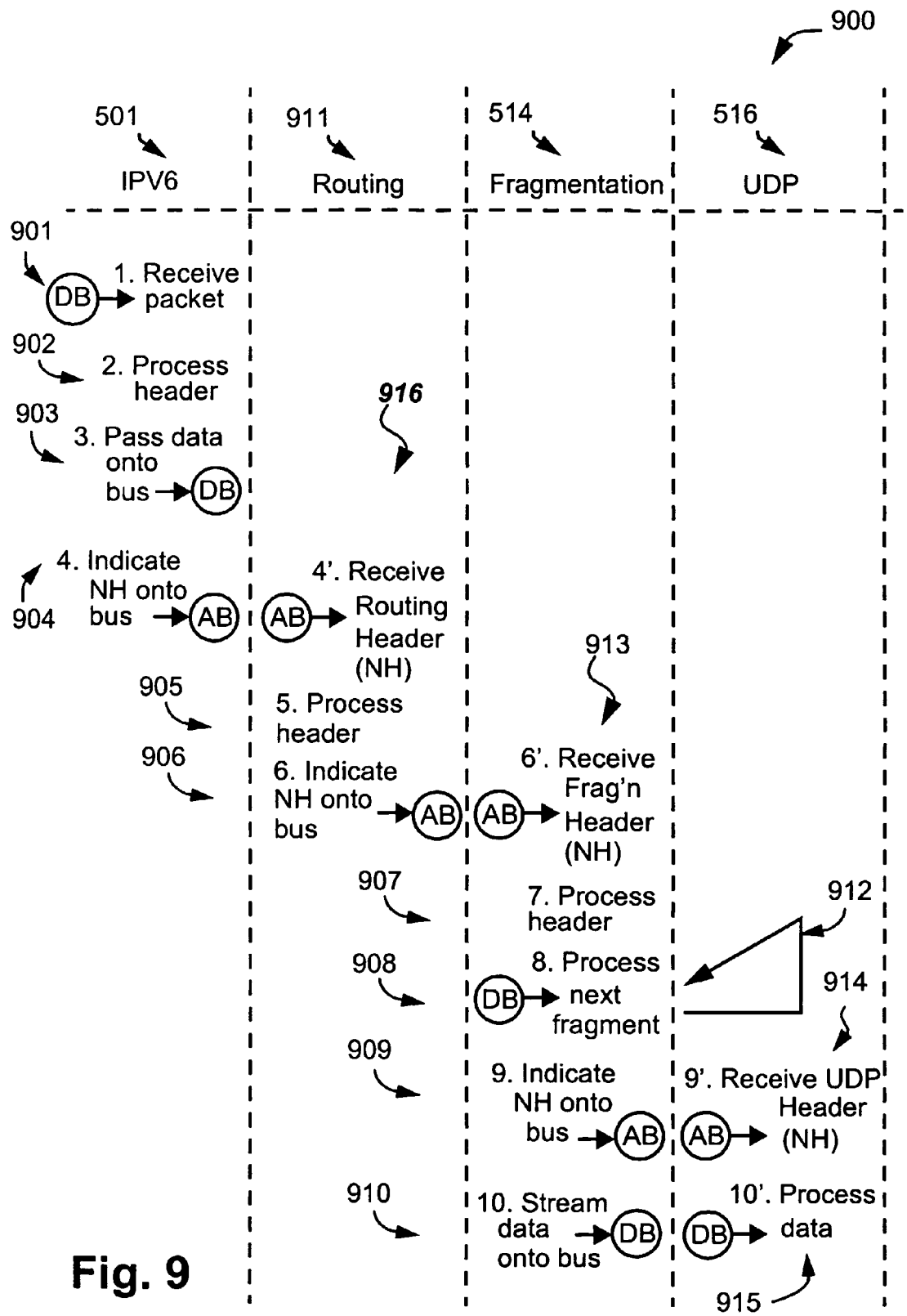
FIG. 9 shows an example of distribution of the process flow of FIG. 8 among processing modules.

FIG. 9 shows a representative process flow 900 for processing an IPv6 packet. FIG. 9 depicts an architecture having the IPv6 receive module 501, a routing module 911, the fragmentation module 514 and the UDP module 516 (see FIG. 5). In a first step 901 the receive module 501 receives a packet (such as 400 in FIG. 4) on the data bus DB that forms part of the bus 511 in FIG. 5. In a following step 902 the receive module 501 processes the header (at 401-404 in FIG. 4), and in a following step 903 the receive module 501 passes data from 405 onwards onto the data bus DB. In a subsequent step 904, the receive module 501 indicates the NEXT HEADER field (at 402) onto the address bus AB which forms part of the bus 511 of FIG. 5. In a step 916 the routing module 911 receives the routing NEXT HEADER information (from 402) on the address bus AB and in a following step 905 the routing module 911 processes this header. Thereafter, in a step 906 the routing module 911 indicates the NEXT HEADER (from 405 in FIG. 4) onto the address bus AB, after which in a step 913 the fragmentation module 514 receives that NEXT HEADER on the address bus AB from 405.

In a following step 907 the fragmentation module 514 processes the aforementioned NEXT HEADER information, and in a following step 908 the fragmentation module 514 processes the data (from 410) associated with the next fragment, this data being read off the data bus DB. A re-entrant arrow 912 at the step 908 indicates that the aspect of packet de-fragmentation is performed iteratively across multiple packets until all fragments of the original fragmented data packet have been collected in the data fragment buffer.

In a following step 909 the fragmentation module 514 indicates the subsequent NEXT HEADER onto the address bus AB after which in a step 914 the UDP module 516 receives this UDP header for processing. The NEXT HEADER indicating UDP is at the packet part 408 in the packet 400. The UDP header itself is at the start of the packet part 410.

In a subsequent step 910 the fragmentation module 514 streams data from 410 onto the data bus DB after which the UDP module 516 in a step 915 receives the data from the data bus DB and processes the data.

It is apparent from FIG. 9 that the packet process 900 involves communication between successive modules that move in a rightward direction in FIG. 9. Thus, while initial communication takes place between the receive module 501 and the routing and fragmentation modules 911, 514, the receive module 501 is no longer involved after the step 905 takes place. Thus the communication flow between the modules is far more linear than that described in regard to FIG. 3.

Figure 10:
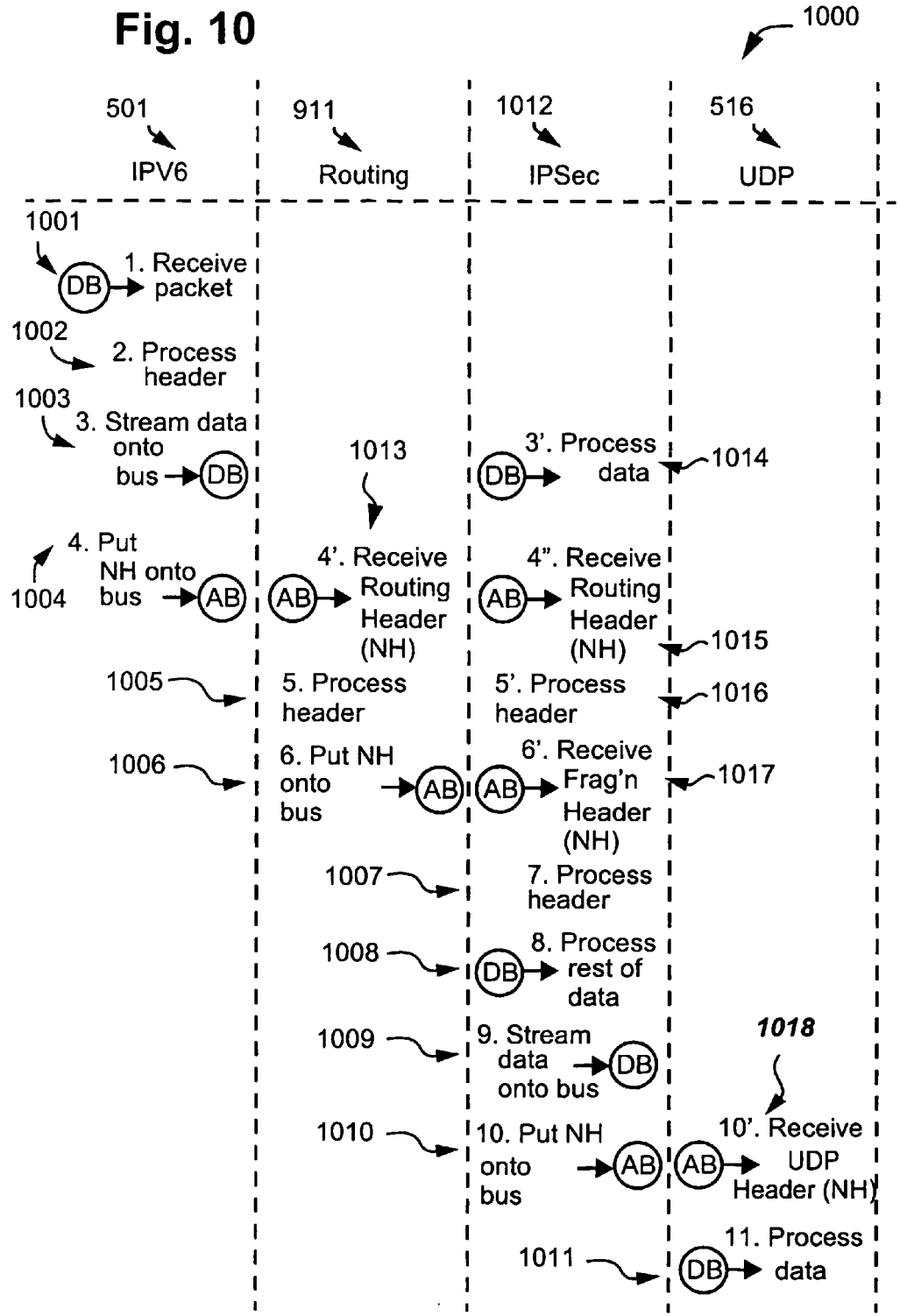
FIG. 10 shows another example of distribution of the process flow among processing modules.

FIG. 10 shows a representative process flow 1000 for a system in which the IPv6 receive module 501, the routing module 911, an IPSec module 1012, and the UDP module 516 are present. The packet being considered in FIG. 10 differs from the packet 400 in FIG. 4 by containing different OPTIONS, one relating to the routing OPTION that is addressed by the routing module 911, and one relating to the IPSec functionality that is addressed by the IPSec module 1012.

In a step 1001 the receive module 501 receives the noted packet on the data bus DB that forms part of the bus 511 in FIG. 5. In a following step 1002 the receive module 501 processes the header and in a following step 1003 the receive module 501 starts streaming packet data onto the data bus DB. In a step 1014 the IPSec module 1012 picks this data off the data bus DB and commences processing the data.

In a following step 1004 the receive module 501 places the subsequent NEXT HEADER onto the address bus AB. In the present example this NEXT HEADER relates to the routing OPTION. Accordingly, in a step 1013 the routing module 911 picks the aforementioned NEXT HEADER off the address bus AB. Furthermore, the IPSec module 1012 also receives in a step 1015 the aforementioned NEXT HEADER that relates to the ROUTING option from the address bus AB.

In a following step 1005 the routing module 911 commences processing of the aforementioned NEXT HEADER, as does the IPSec module 1012 in a step 1016. Thereafter in a step 1006 the routing module 911 places the subsequent NEXT HEADER, this relating to the IPSec OPTION onto the address bus AB. The IPSec 1012 receives the aforementioned NEXT HEADER off the address bus AB in a step 1017, and continues processing this in a following step 1007.

In a following step 1008 the IPSec module 1012 processes the remainder of the packet data which is being streamed onto the data bus DB. In a following step 1009 the IPSec module 1012 streams this packet data onto the data bus DB, after which the IPSec module 1012 places a subsequent NEXT HEADER onto the address bus AB in a step 1010. This NEXT HEADER relates to the particular transport protocol being considered in this example, which as shown in FIG. 10 is the UDP protocol. Accordingly, the UDP module 516 picks the aforementioned NEXT HEADER off the address bus AB in a step 1018, and processes this NEXT HEADER in a subsequent step 1011.

Figure 11:
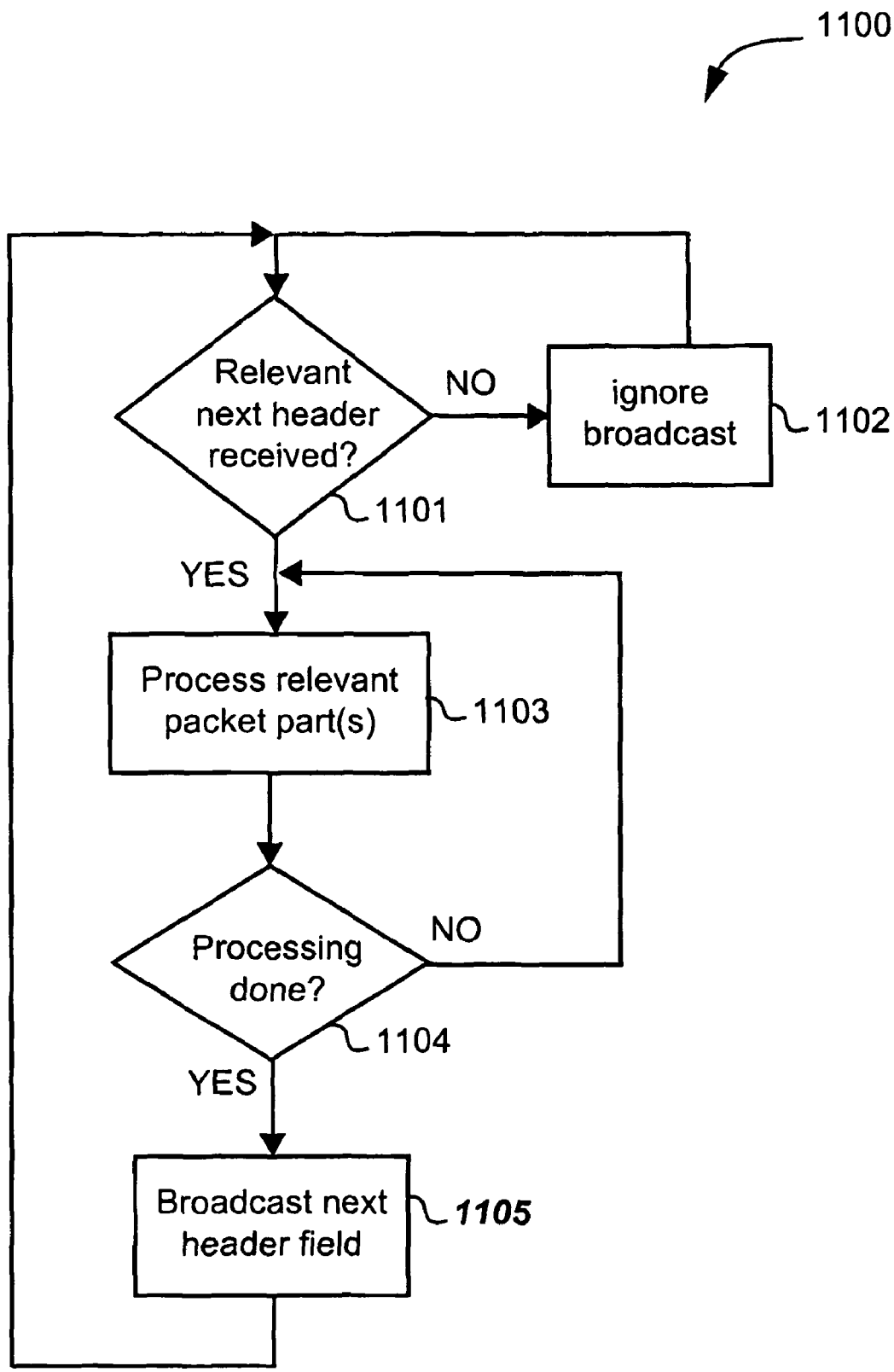
FIG. 11 shows a top level process for processing packet parts according to the disclosed modular architecture.

FIG. 11 shows a top level process 1100 for processing packet parts according to the disclosed modular architecture. The process 1100 commences with a test step 1101 wherein a particular hardware processing module listens on the common communication medium (such as 609 in FIG. 6) in order to determine if a next header field (from a received packet part) associated with the hardware processing module in question has been broadcast. If this is not the case, then the process 1100 is directed by a NO arrow to a step 1102 in which the hardware processing module in question ignores any next header fields that may have been received, and the process 1100 is directed back to the step 1101.

If however the step 1101 returns a logical TRUE value, then the process 1100 is directed by a YES arrow to a step 1103 in which the hardware processing module in question processes the associated received packet part(s). In a following step 1104 the hardware processing module determines if the received packet part(s) have been completely processed, and if not, then the process 1100 follows a NO arrow back to the step 1103.

If however the aforementioned processing of the received packet part(s) has been completed, then the process 1100 is directed by a YES arrow to a step 1105 in which the hardware processing module in question broadcasts the next header field of the subsequent received packet part(s) onto the common communication medium.

Typically, the hardware processing module in question will now have completed it's processing of the current packet, as described in relation to FIGS. 9 and 10 for example. Other hardware processing modules then follow a similar process to 1100 in order to perform their part of processing the relevant packet parts of the packet in question.

In practical terms, ASIC devices for IPv6 applications are often designed and tested using Field Programmable Gate Array (FPGA) or equivalent technology. The design stage (referred to in this description as the synthesis stage) typically involves a functional design flow commencing with (a) development of the initial system concept, then moving to (b) design of the overall architecture and individual blocks, followed by (c) preparation of an RTL description, and then (d) hardware synthesis. The disclosed modular approach enables desired modules to be defined at a number of points in this synthesis process.

When designing and fabricating a customised IPv6 processing system or device using the disclosed modular architecture, one particularly convenient point for defining the desired modules is at the RTL description stage. An RTL description for an IPv6 device that is designed using the disclosed modular approach is a specialised RTL description in which undesired modules have, for example, been "commented out". Alternately, the RTL description sections relating to undesired modules can simply be removed. Another option is to use known-capabilities of the RTL descriptive language to generate the desired modules, while omitting undesired modules.

The use of common communication media and uniform module interfaces enable a specialised IPv6 device to be designed and built, using the modular approach. Modules are added or removed without requiring additional adjustment to other modules or to the overall device. In some situations, a small amount of "glue logic" may be required in order to enable module removal and/or addition. Thus, where certain components will only interface with one type of bus, and the bus systems associated with the noted components are of a similar but not identical type, bridging glue logic can be used to connect the components to a bus so that both the modules and the rest of the system using the bus will work together. An example of bus types that may be connected like this are AMBA™ and CoreConnect™.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method for processing a packet comprising an ordered sequence of packet parts using a set of hardware processing modules, said ordered sequence of packet parts being associated with a header, the method comprising the steps of:
   a first processing step of processing the header to indicate a first next header field;
   a first broadcasting step of broadcasting the first next header field to the set of processing modules;
   a second processing step of processing a received packet part of the ordered sequence of packet parts by a first processing module of the set of processing modules dependent upon the broadcast first next header field;
   a third processing step of processing the header by said first processing module to indicate a second next header field; and
   a second broadcasting step of broadcasting, by said first processing module, the second next header field to the set of processing modules, wherein the second next header field is different from the first next header field.

2. A method according to claim 1, wherein, the packet is an IPv6 packet.

3. A method according to claim 2, wherein prior to the second processing step, the method comprises the steps of:
   identifying at least one options field expected to be present in the received packet part;

incorporating in the set of hardware processing modules, a sub-set of hardware processing modules corresponding to the identified options field; and omitting from the set of hardware processing modules, a sub-set of hardware processing modules not corresponding to the identified options fields.

4. A method according to claim 3, wherein:

the method is performed using an Application Specific Integrated Circuit (ASIC); and the incorporating and omitting steps are performed at least during one of:

a system block label synthesis stage;

a Register Transfer Level (RTL) description level synthesis stage; and a net list level synthesis stage, for the ASIC.

5. A method according to claim 4 further comprising, prior to the second processing step, a step of:

seizing control, by one of the sub-set of modules, dependent upon the broadcast first next header field.

6. A method according to claim 5 further comprising, following the second broadcasting step of broadcasting of the second next header field, a step of:

repeating each of the steps, including the seizing step, until the packet is completely processed.

7. A method according to claim 6, wherein:

the set of hardware processing modules is associated with a corresponding set of logical indices; and wherein in regard to a current packet:

the repeated steps are performed in a linearly progressive manner in regard to a sub-set of logical indices, whereby once a current sub-set of hardware processing modules has performed an associated processing operation on an associated packet part, the current sub-set of hardware modules is no longer needed to process the associated packet part.

8. A modular apparatus for processing a packet comprising an ordered sequence of packet parts, said ordered sequence of packet parts being associated with a header, the apparatus comprising:

a set of hardware processing modules;

first processing means for processing the header to indicate a first next header field;

first broadcasting means for broadcasting the first next header field to the set of processing modules;

second processing means for processing a received packet part of the ordered sequence of packet parts by a first processing module of the set of processing modules dependent upon the broadcast first next header field;

third processing means for processing the header by said first processing module to indicate a second next header field; and second broadcasting means for broadcasting, by said first processing module, the second next header field to the set of processing modules, wherein the second next header field is different from the first next header field.

9. An apparatus according to claim 8, wherein the hardware processing modules communicate using a common communication medium.

10. An apparatus according to claim 9, wherein the hardware processing modules are connected to the common communication medium by common interfaces.

11. A method according to claim 1 further comprising at least one of the steps of:

supporting addition and removal of a processing module at the network layer and the transport layer; and dropping the received packet if a required processing module is not present.

\* \* \* \* \*